UNITED STATES PATENT OFFICE.

RENE RAVENEL SNOWDEN, OF LOS ANGELES, CALIFORNIA, ASSIGNOR OF ONE-FOURTH TO JOHN R. KLINE, OF LOS ANGELES, CALIFORNIA, ONE-FOURTH TO ANTHONY SCHAUB, OF PITTSBURG, PENNSYLVANIA, AND ONE-FOURTH TO CHARLES W. FLANAGAN, OF LAKELAND, FLORIDA.

COMPOSITION OF MATTER.

952,762.  Specification of Letters Patent.  Patented Mar. 22, 1910.

No Drawing.  Application filed April 15, 1909. Serial No. 490,169.

*To all whom it may concern:*

Be it known that I, RENE RAVENEL SNOWDEN, a citizen of the United States, residing at Los Angeles, in the county of Los Angeles and State of California, have invented new and useful Improvements in Composition of Matter, of which the following is a specification.

This invention relates to composition of matter; and it has for its object to provide a composition of matter particularly or peculiarly constituted and adapted for use in making joints between or intimately connecting metallic substances and materials.

The composition of matter constituting the invention serves effectually as a substitute or equivalent for solder; and the use thereof obviates the employment of any soldering fluid, flux or soldering iron.

A particular object of the invention consists in the provision of a composition of matter generally characterized as above, which may be conveniently applied in the process of joint-making by the mere subjection of a portion or mass of the same to heat after the deposit of the composition upon the materials or substances to be joined.

Further general objects of the invention consist in the provision of such solder substitute, which will be comparatively inexpensive in production, convenient in use and application, positive and durable in holding function, and generally superior in point of efficiency in service and the appearance of the joint resultant upon its use, and by the use of which a perfect electrical contact between the parts joined may be obtained.

In carrying out the invention, I employ primarily a suitable solder, which is combined intimately with other substances and materials, in the manner hereinafter described, to produce the composition of matter constituting the invention.

Selecting a quantity of stock solder, having the proper melting point, I heat the same until the mass is reduced to a plastic condition, such condition being maintained by the application of sufficient heat while the entirety is thoroughly mixed with a soluble salt, such as sodium chlorid. The result of this co-mingling of the solder and salt will be the breaking up of the solder mass into pulverulent form, the finely divided particles being allowed to cool and harden. The salt is then removed from the powder so produced by rinsing, the salt being thus taken up in solution in the water employed for the rinsing process. The powder freed of the salt is then dried. I now have the solder in a powdered form. This I then mix with a non-acid metallic chlorid such as dry zinc chlorid, which performs the function of a flux flour; a hygroscopic substance, such as glycerin, and enough water to reduce the entire mass to a plastic consistency. The entire mass is now thoroughly agitated to cause a thoroughly homogeneous result, and is then heated in a suitable vessel, preferably by immersion in a hot water bath, until the flour is well cooked. The composition is then completely constituted, and upon being allowed to cool remains in a plastic condition, being used as a paste, as a solder substitute compound or composition.

The proportion of the several constituent parts or ingredients which I have found to produce highly satisfactory results are as follows: Powdered solder (produced as above described) 15 to 20 parts; zinc chlorid, 2 parts; flour, $\frac{1}{2}$ part; glycerin, 1 part; and water of sufficient quantity to produce the plastic consistency above stated. About $5\frac{1}{2}$ parts of water I have found to be a satisfactory quantity.

The above proportions may be varied without defeating the objects of the invention, and the specific proportions stated need not be inflexibly adhered to, in order to produce a satisfactory and efficient composition of matter, qualified for the purposes above set forth.

Having thus described my invention, I claim and desire to secure by Letters Patent:—

1. The composition of matter comprising a solder in finely divided form, a metallic chlorid, a cereal in finely divided form, and a hygroscopic substance.

2. The composition of matter comprising a solder in finely divided form, a metallic chlorid, a cereal in finely divided form, and a hygroscopic substance; co-mingled to plastic consistency.

3. The composition of matter comprising powdered solder, a metallic chlorid, a powdered cereal, and a hygroscopic substance; co-mingled to plastic consistency.

4. The composition of matter comprising powdered solder, a metallic chlorid, a cooked cereal, and a hygroscopic substance; co-mingled to plastic consistency.

5. The composition of matter comprising a finely divided metallic composition, a flux, a finely divided cereal, and a hygroscopic substance.

6. The composition of matter comprising a finely divided metallic composition, a flux, a cooked cereal, and a hygroscopic substance.

7. The composition of matter comprising powdered solder, zinc chlorid, flour, and glycerin.

8. The composition of matter comprising powdered solder, zinc chlorid, cooked flour, and glycerin.

9. The composition of matter comprising powdered solder, zinc chlorid, flour, glycerin, and water; co-mingled to a plastic consistency.

10. As a solder substitute, the herein-described composition of matter consisting of powdered solder, 15 parts; zinc chlorid 2 parts; flour $\frac{1}{2}$ part; glycerin 1 part; and water $5\frac{1}{2}$ parts.

11. As a solder substitute, the herein-described composition of matter consisting of powdered solder 15 parts; zinc chlorid 2 parts; cooked flour $\frac{1}{2}$ part; glycerin 1 part; and water $5\frac{1}{2}$ parts.

12. As a solder substitute, the herein-described composition of matter comprising powdered solder 15 parts; zinc chlorid 2 parts; cooked flour $\frac{1}{2}$ part; and glycerin 1 part.

In testimony whereof, I have signed my name to this specification in the presence of two subscribing witnesses.

RENE RAVENEL SNOWDEN.

Witnesses:
    FRED A. MANSFIELD,
    TILLIE E. ADAM.